United States Patent
Veprinsky et al.

(10) Patent No.: US 8,380,956 B1
(45) Date of Patent: Feb. 19, 2013

(54) TECHNIQUES FOR STORING DATA TO DEVICE MIRRORS

(75) Inventors: Alex Veprinsky, Brookline, MA (US); Amnon Naamad, Brookline, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 167 days.

(21) Appl. No.: 13/065,014

(22) Filed: Mar. 11, 2011

(51) Int. Cl.
*G06F 12/00* (2006.01)
*G06F 13/00* (2006.01)

(52) U.S. Cl. .............. 711/162; 711/10; 711/154

(58) Field of Classification Search ............ 711/100, 711/111, 154, 162, 170
See application file for complete search history.

(56) References Cited

U.S. PATENT DOCUMENTS

| | | | | |
|---|---|---|---|---|
| 5,455,926 A * | 10/1995 | Keele et al. | | 711/4 |
| 5,586,248 A * | 12/1996 | Alexander et al. | | 714/22 |
| 5,959,860 A * | 9/1999 | Styczinski | | 700/12 |
| 6,112,255 A * | 8/2000 | Dunn et al. | | 710/7 |
| 7,020,742 B2 * | 3/2006 | Beeston et al. | | 711/111 |

* cited by examiner

*Primary Examiner* — Tuan Thai
(74) *Attorney, Agent, or Firm* — Muirhead and Saturnelli, LLC

(57) ABSTRACT

Described are techniques for storing first data to a logical data in accordance with a static policy to service reads using data stored in a first storage area. The logical device has its data stored on a first physical device that is mirrored on a second physical device. Each of the first and second physical devices include a first storage area and a second storage area. The first storage areas provide better performance than the second storage areas. The first data is stored at a first location in one of the first storage areas of one of the physical devices and at a second location in one of the second storage areas at the other of the first and the second physical devices. An operation to read the first data is serviced by accessing the first data stored in the first area of the one physical device.

20 Claims, 16 Drawing Sheets

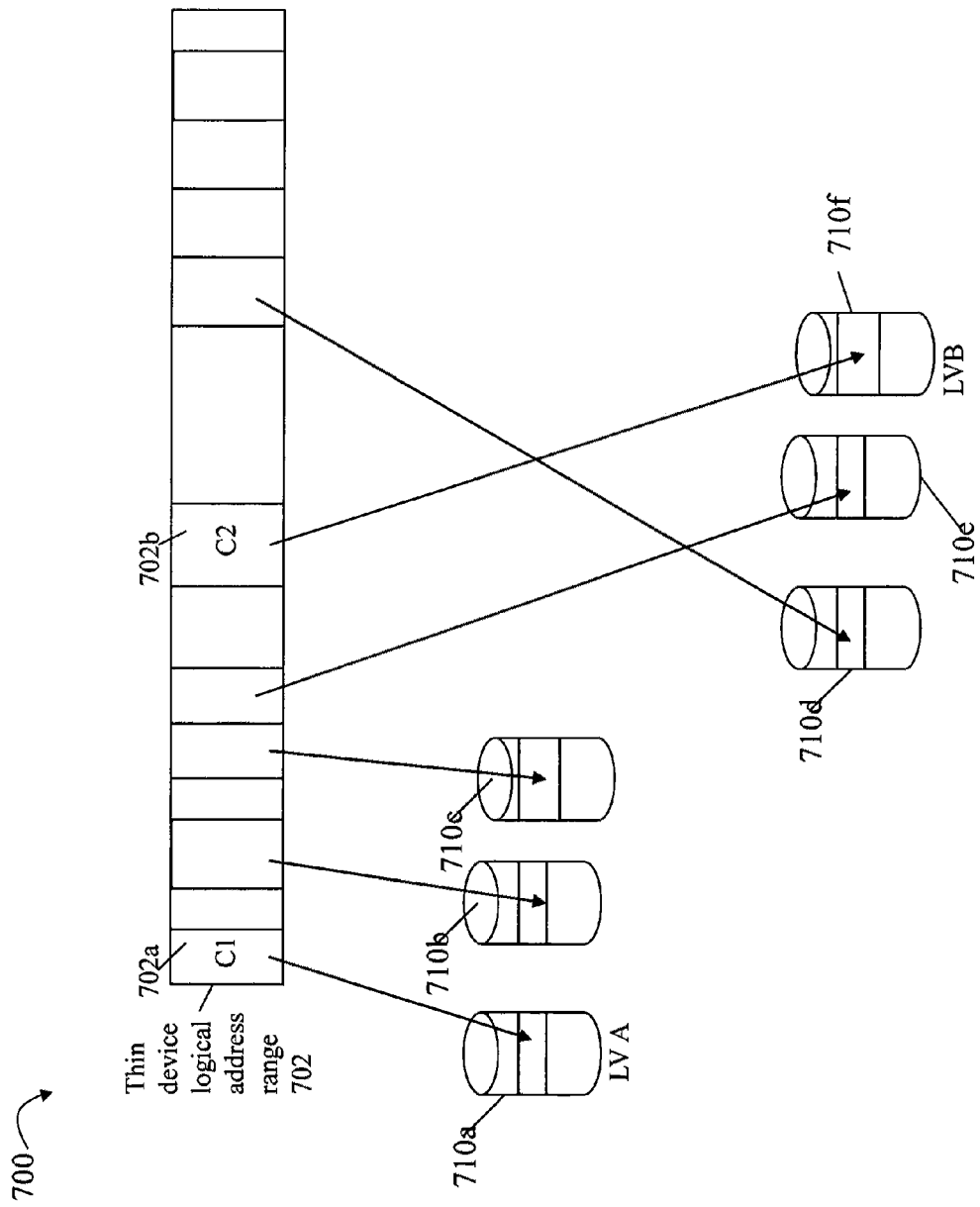

TECHNIQUES FOR STORING DATA TO DEVICE MIRRORS

BACKGROUND

1. Technical Field

This application generally relates to data storage, and more particularly to techniques used in connection with storing data to device mirrors.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, data mirroring may be implemented where data stored to a first physical device is also stored to a second physical device. When servicing a data request for data that is mirrored, a dynamic mirror service policy may evaluate, at the time of the request, which copy of the data to use from either the first or the second physical device. The dynamic mirror service policy may use one or more dynamically changing criteria (e.g., that change over time) such as physical device activity to select either the first or the second physical device.

SUMMARY OF THE INVENTION

In accordance with one aspect of the invention is a method for storing data of a logical device comprising: performing an operation to store first data to the logical device in accordance with a static policy, said logical device having data stored on a first physical device that is mirrored on a second physical device, wherein each of said first and second physical devices are defined to include a first storage area and a second storage area, said first storage area of said first physical device and said first storage area of said second physical device being corresponding physical portions each associated with a same first set of physical storage locations, said second storage area of said first physical device and said second storage area of said second physical device being corresponding physical portions each associated with a same second set of physical storage locations, said first storage areas of the first physical device and the second physical device providing better performance for accessing data than said second storage areas of the first physical device and the second physical device, said static policy indicating to service reads for logical devices using data stored in one of said first storage areas; storing said first data at a first location in one of the first storage areas of one of the first and the second physical devices; storing said first data at a second location in one of the second storage areas at the other of the first and the second physical devices; receiving a read operation to read said first data; and servicing said read operation in accordance with said static policy by accessing said first data stored in the first area of said one physical device. The first physical device may be a first disk drive and the second physical device may be a second disk drive. The first storage area of the first disk drive may include a first portion of the first disk drive defined at a starting track and cylinder located at a first predefined distance from an outer edge of said first disk drive to an ending track and cylinder located at a second predefined distance from the outer edge, wherein said first disk drive and said second disk drive have corresponding physical configurations and wherein the second storage area of the second disk drive is defined to include remaining tracks of the second disk drive which do not correspond to tracks included in the first storage area of the first disk drive. The first predefined distance may be approximately 10% of a radius of the first disk drive. The second predefined distance may be a value selected from the approximate range of 45% to 50% of the radius. The first storage areas of the first disk drive and the second disk drive may each include approximately 50% of a total capacity of the respective disk drive and wherein the second storage areas of the first disk drive and the second disk drive may each include approximately 50% of a total capacity of the respective disk drive. The second storage area of the second disk drive may include a first inner portion of tracks and a second outer portion of tracks separated by a third intermediate portion of tracks, wherein the third intermediate portion of the second disk drive may include only tracks of the second disk drive corresponding to tracks of the first storage area of the first disk drive. If the static policy further indicates to service reads for the logical device using data stored in the first storage area of the first physical device, all data portions written to the logical device may be Written to the first storage area of the first physical device and the second storage area of the second physical device. A second logical device may have data stored on the first physical device that is mirrored on the second physical device, and wherein if the static policy further indicates to service reads for the second logical device using data stored in the first storage area of the second physical device, all data portions written to said second logical device may be written to the first storage area of the second device and the second storage area of the first device. The logical device may be a thin provisioned device having data portions stored on a first plurality of different physical devices and wherein the data portions may be mirrored on a second plurality of different physical devices. The logical device may have a storage capacity wherein physical storage is unallocated for at least a first portion of said storage capacity at a point in time, said first portion corresponding to a range of addresses of said logical device not mapped to physical storage. The first set of physical storage locations may be a first predefined set of corresponding physical device tracks and cylinders for storing data. The second set of physical storage locations may be a second predefined set of corresponding physical device tracks and cylinders for storing data.

In accordance with another aspect of the invention is a computer readable medium comprising code stored thereon for storing data of a logical device, the computer readable medium comprising code for: performing an operation to store first data to the logical device in accordance with a static policy, said logical device having data stored on a first physical device that is mirrored on a second physical device, wherein each of said first and second physical devices are defined to include a first storage area and a second storage area, said first storage area of said first physical device and said first storage area of said second physical device being corresponding physical portions each associated with a same first set of physical storage locations, said second storage area of said first physical device and said second storage area of said second physical device being corresponding physical portions each associated with a same second set of physical storage locations, said first storage areas of the first physical device and the second physical device providing better performance for accessing data than said second storage areas of the first physical device and the second physical device, said static policy indicating to service reads for logical devices using data stored in one of said first storage areas; storing said first data at a first location in one of the first storage areas of one of the first and the second physical devices; storing said first data at a second location in one of the second storage areas at the other of the first and the second physical devices; receiving a read operation to read said first data; and servicing said read operation in accordance with said static policy by accessing said first data stored in the first area of said one physical device. The first physical device may be a first disk drive and the second physical device may be a second disk drive. The first storage area of the first disk drive may include a first portion of the first disk drive defined at a starting track and cylinder located at a first predefined distance from an outer edge of said first disk drive to an ending track and cylinder located at a second predefined distance from the outer edge, wherein said first disk drive and said second disk drive may have corresponding physical configurations and wherein the second storage area of the second disk drive may be defined to include remaining tracks of the second disk drive which do not correspond to tracks included in the first storage area of the first disk drive. The first predefined distance may be approximately 10% of a radius of the first disk drive. The second predefined distance may be a value selected from the approximate range of 45% to 50% of the radius. The first storage areas of the first disk drive and the second disk drive may each include approximately 50% of a total capacity of the respective disk drive and wherein the second storage areas of the first disk drive and the second disk drive may each include approximately 50% of a total capacity of the respective disk drive. The second storage area of the second disk drive may include a first inner portion of tracks and a second outer portion of tracks separated by a third intermediate portion of tracks, wherein the third intermediate portion of the second disk drive may include only tracks of the second disk drive corresponding to tracks of the first storage area of the first disk drive.

In accordance with another aspect of the invention is a data storage system comprising one or more rotating disk drives, wherein a logical device is configured having storage capacity on one or more of said rotating disk drives; and a computer readable medium comprising code stored thereon for storing data to the logical device, the computer readable medium comprising code for: performing an operation to store first data to the logical device in accordance with a static policy, said logical device having data stored on a first rotating disk drive that is mirrored on a second rotating disk drive, wherein each of said first and second rotating disk drives are defined to include a first storage area and a second storage area, said first storage area of said first rotating disk drive and said first storage area of said second rotating disk drive being corresponding physical portions each associated with a same first set of physical storage locations, said second storage area of said first rotating disk drive and said second storage area of said second rotating disk drive being corresponding physical portions each associated with a same second set of physical storage locations, said first storage areas of the first rotating disk drive and the second rotating disk drive providing better performance for accessing data than said second storage areas of the first rotating disk drive and the second rotating disk drive, said static policy indicating to service reads for logical devices using data stored in one of said first storage areas; storing said first data at a first location in one of the first storage areas of one of the first and the second rotating disk drives; storing said first data at a second location in one of the second storage areas at the other of the first and the second rotating disk drives; receiving a read operation to read said first data; and servicing said read operation in accordance with said static policy by accessing said first data stored in the first area of said one rotating disk drive.

BRIEF DESCRIPTION OF THE DRAWINGS

Features and advantages of the present invention will become more apparent from the following detailed description of exemplary embodiments thereof taken in conjunction with the accompanying drawings in which:

FIG. 4A is an example illustrating mapping to storage pools as may be performed for a thin device;

DETAILED DESCRIPTION OF EMBODIMENT(S)

Figure 1:
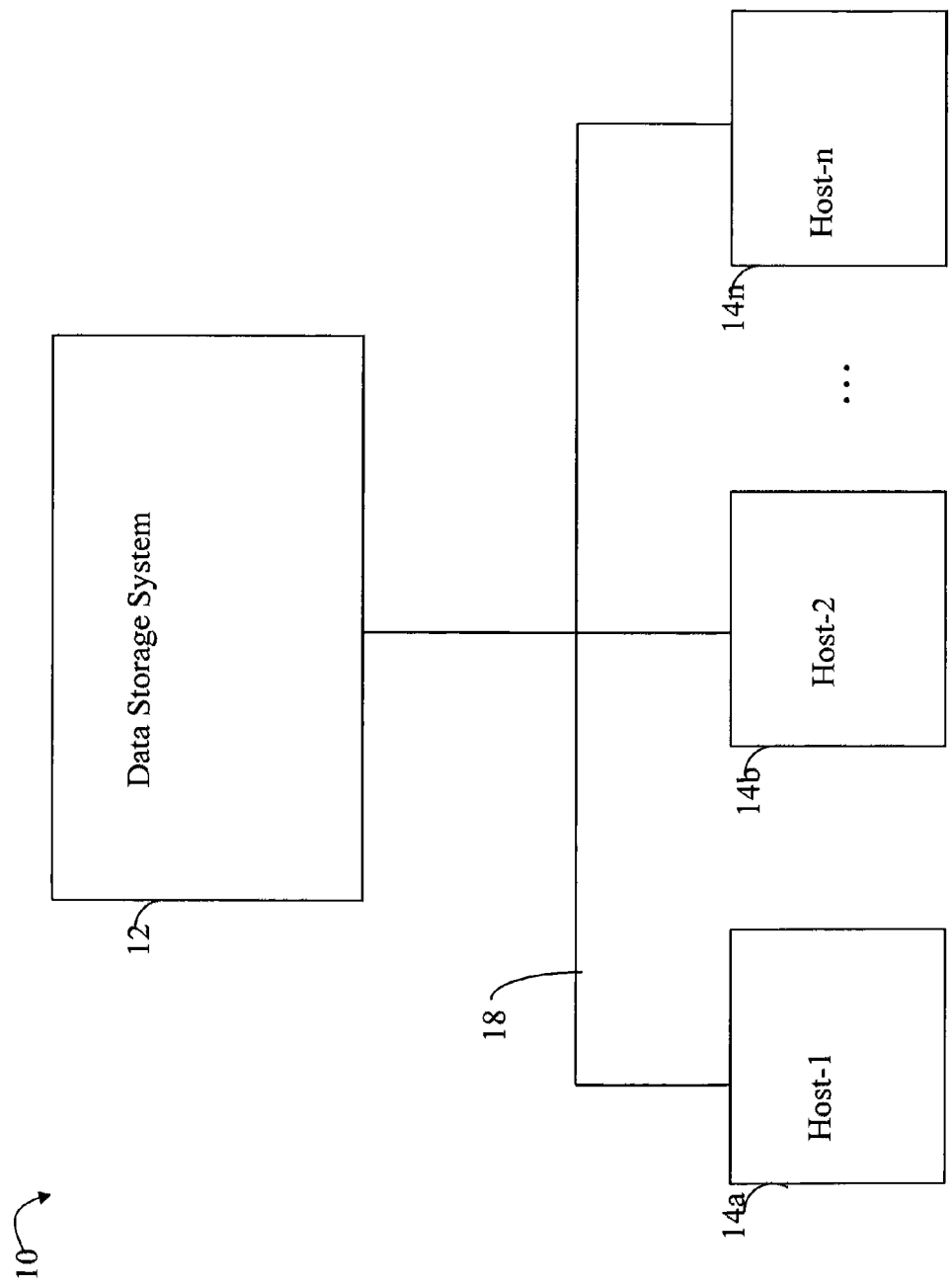
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the data storage system 12 communicates with other components such as host systems 14a-14n.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system 12 may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, Ficon, SCSI, Fibre Channel, or iSCSI, and the like. Some or all of the connections by which the hosts and data storage system 12 may be connected to the communication medium 18 may pass through other communication devices, such as Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment.

Figure 2A:
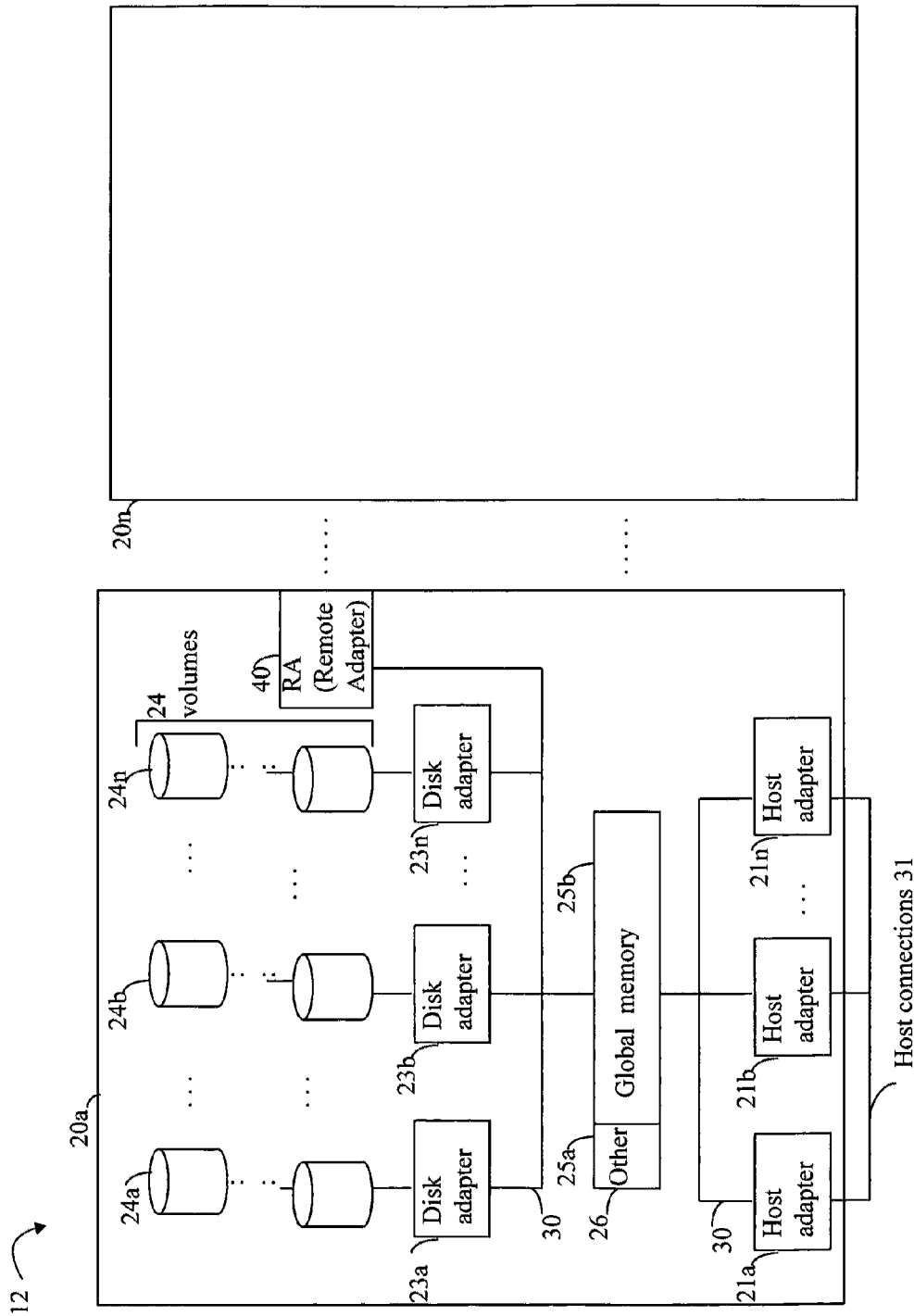
FIG. 2 is a representation of the logical internal communications between the directors and memory included in one embodiment of a data storage system of FIG. 1.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component, such as a DA, may be characterized as a backend component. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses, fabric, and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory (GM) 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual or physical disk drives. For example, one or more LVs may reside on a single physical disk drive. A single LV may also reside on multiple physical drives, for example depending on the RAID protection and layout. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. Data residing on an LV may be accessed by the DA following a data request in connection with I/O operations that other directors originate.

Figure 2B:
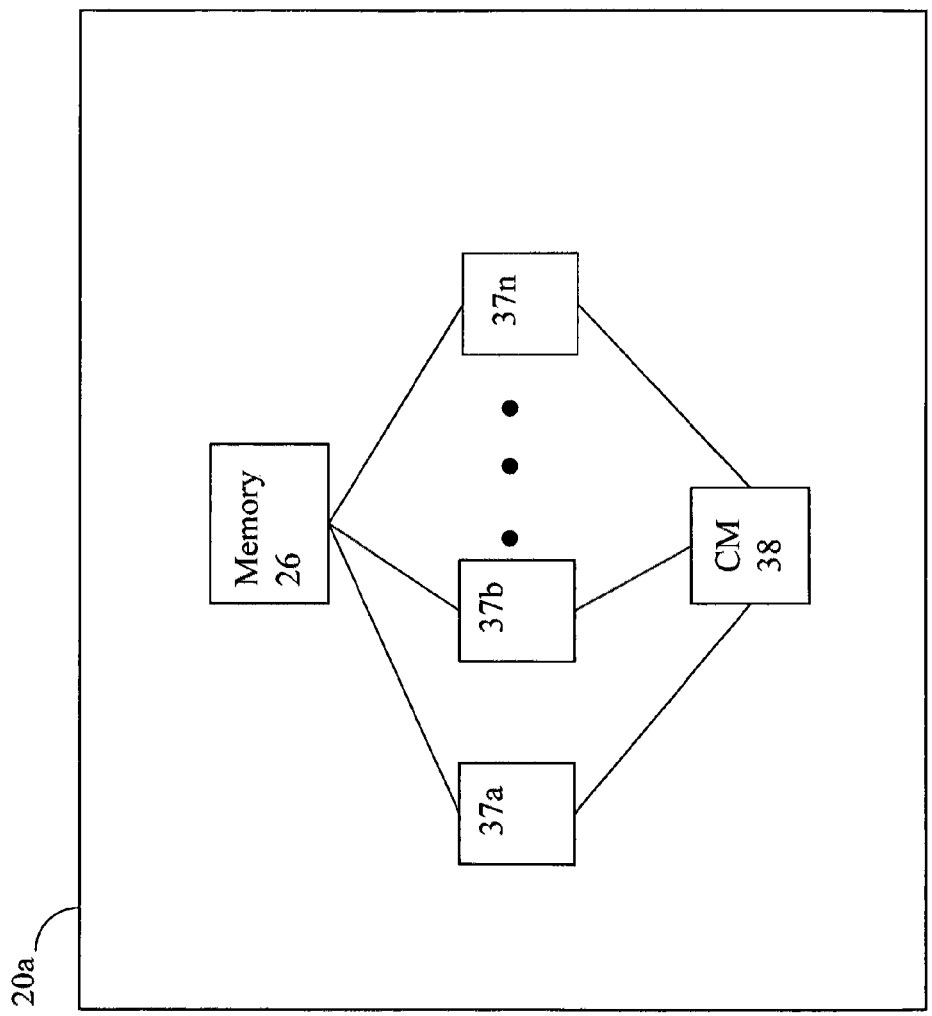

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 2A, components of the data storage system may communicate using GM 25b. For example, in connection with returning data to a host from one of the devices as part of a read operation, the data may be copied from the device by the appropriate DA servicing the device. The DA may copy the data read into a cache slot included in GM which is, in turn, communicated to the appropriate HA in communication with the host.

Figure 3A:
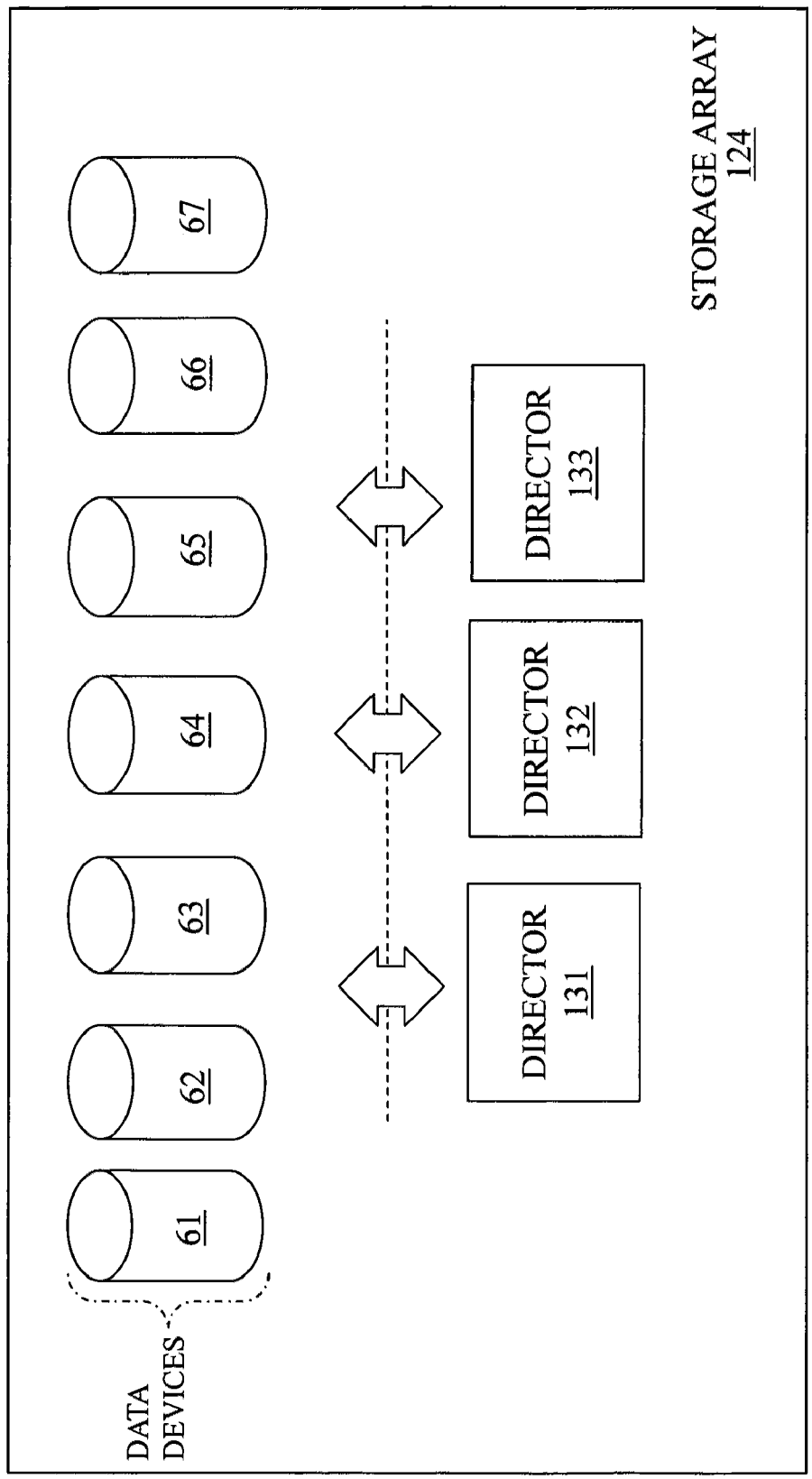
FIGS. 3A and 3B are examples illustrating a data storage system in an embodiment in accordance with techniques herein.

Referring to FIG. 3A, shown is a schematic diagram of the data storage array 124 as including a plurality of data devices 61-67 communicating with directors 131-133. The data devices 61-67 may be implemented as logical devices like standard logical devices (also referred to as thick devices) provided in a Symmetrix® data storage system produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more disk drives. Thus, for example, the data device section 61 may correspond to an entire disk drive or physical storage device, may correspond to a portion of the physical disk drive or other physical device, or may correspond to a first portion of a first physical device and a second portion of a different physical device. Alternatively, in other embodiments that may be used in connection with the system described herein, instead of being separate devices, the data devices 61-67 may be sections of one data device.

Figure 3B:
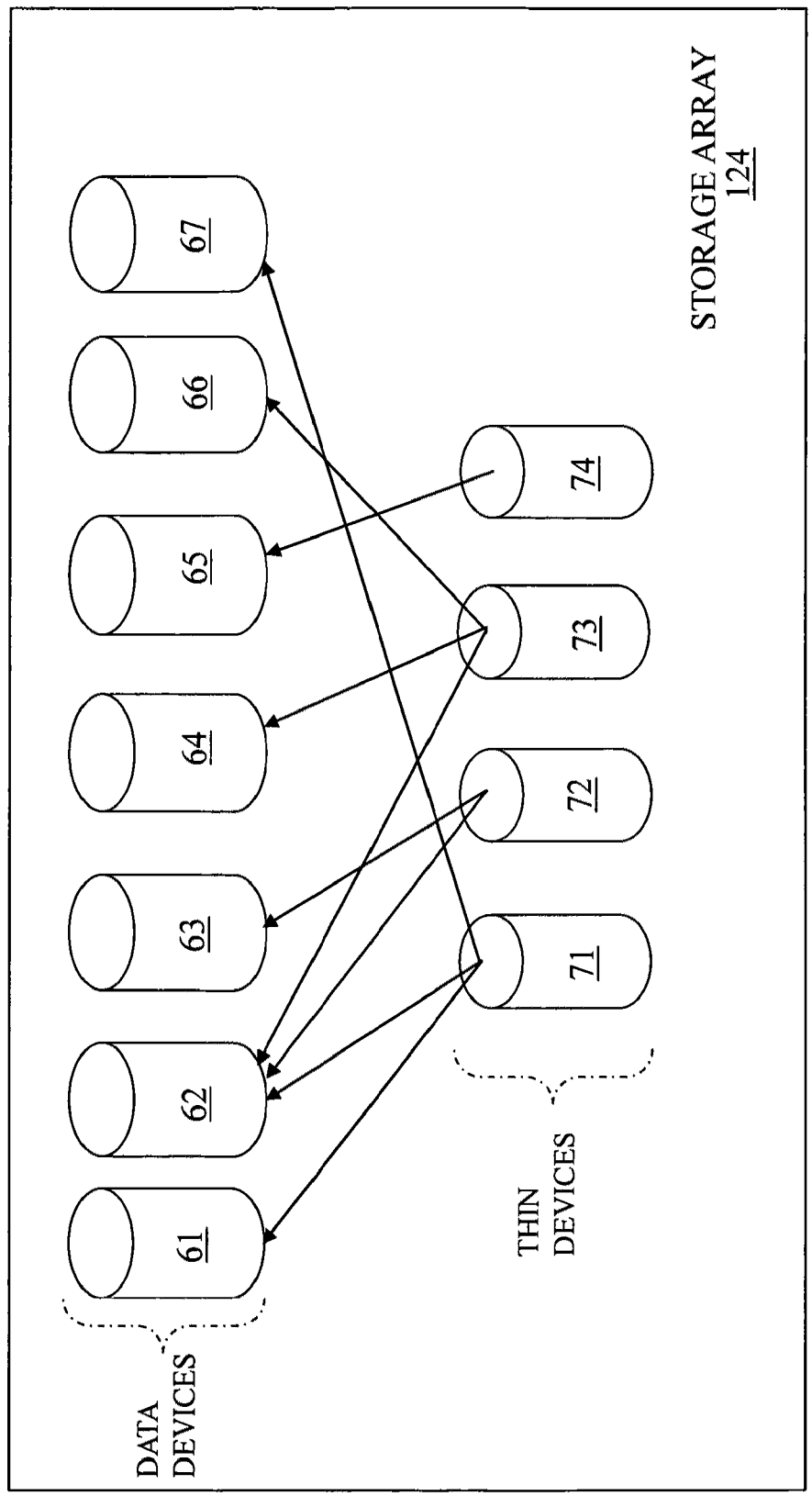

As shown in FIG. 3B, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof). In other words in one embodiment, the thin device may be implemented on top of, or mapped to, the logical volumes or data devices 61-67.

Figure 3C:
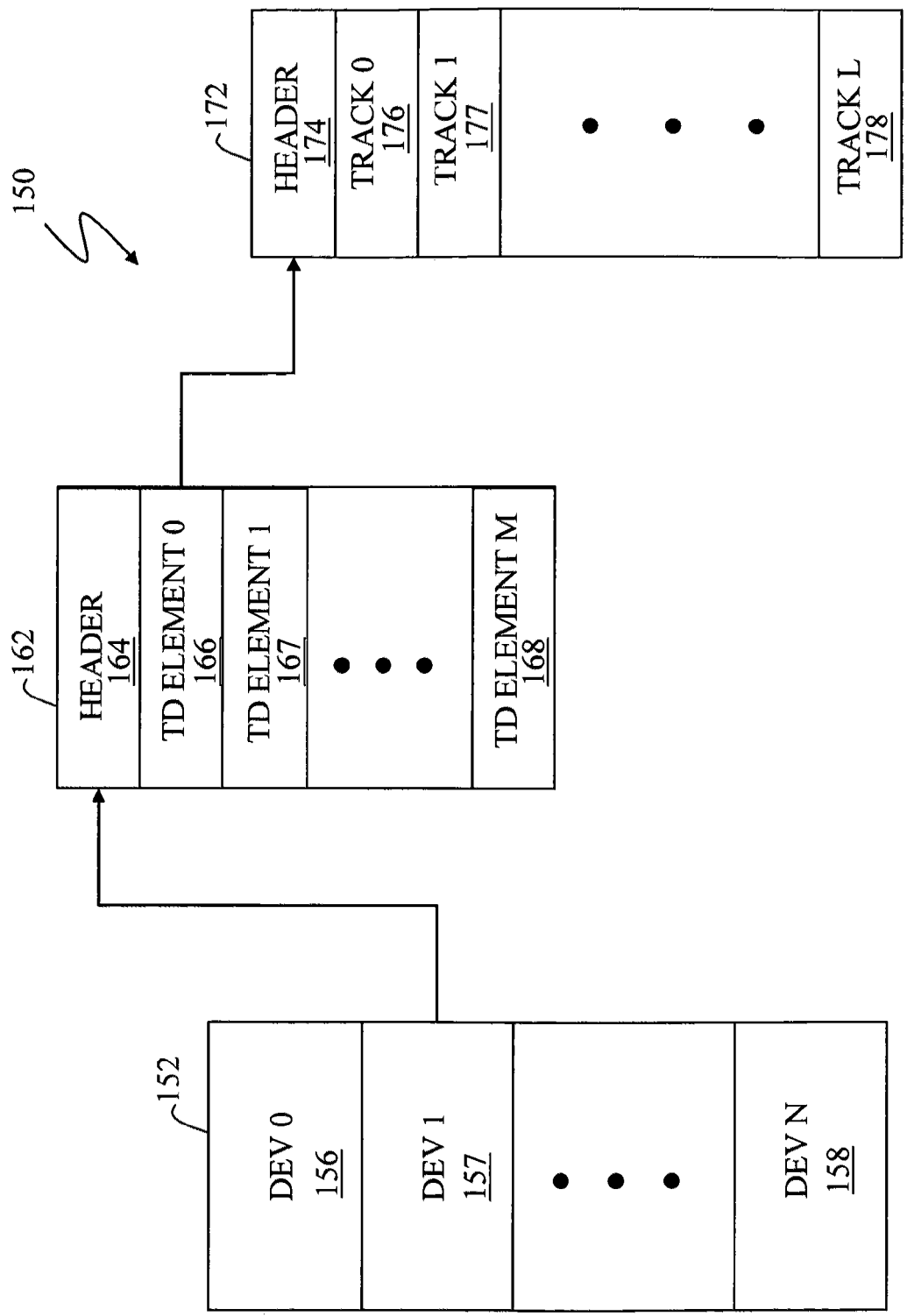
FIG. 3C is a schematic diagram illustrating tables that are used to keep track of device information in connection with an embodiment of the system described herein.

Referring to FIG. 3C, shown is a diagram 150 illustrating tables that are used to keep track of device information. A first table 152 corresponds to all of the devices used by a data storage system or by an element of a data storage system, such as an HA and/or a DA. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the tables 162 and 172 may be used in connection with mapping logical addresses of the logical device of 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 3D:
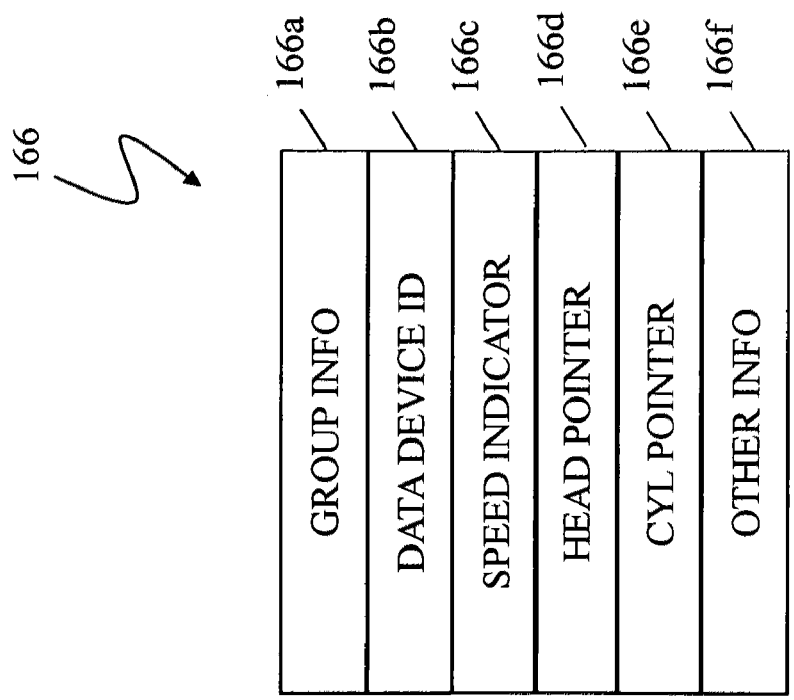
FIG. 3D is a schematic diagram showing a group element of a thin device table in connection with an embodiment of the system described herein.

Referring to FIG. 3D, shown is a schematic diagram illustrating a group element 166 of the thin device table 162 in connection with an embodiment of the system described herein. The group element 166 may includes a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b. The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device may not be mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. patent application Ser. No. 11/903,869, filed Sep. 25, 2007, DATA DE-DUPLICATION USING THIN PROVISIONING, Veprinsky et al., EMS-177US, both of which are incorporated by reference herein.

As discussed elsewhere herein, the data devices 61-67 (such as LVs or other logical devices) may be associated with physical storage areas of disk drives. The devices 61-67 may appear to a host coupled to the storage device 24 as a logical volume (logical device) containing a contiguous block of data storage, as discussed herein. Accordingly, each of the devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size.

As described above, a thin device (also referred to as a virtual provision device) is a device that represents a certain capacity having an associated logical address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks). A thin device may be constructed of chunks having a size that may vary with embodiment. For example, in one embodiment, a chunk may correspond to a group of 12 tracks (e.g., 12 tracks*64 Kbytes/track=768 Kbytes/chunk). As also noted with a thin device, the different chunks may reside on different data devices. With thin devices, a system in accordance with techniques herein has flexibility to store data of individual chunks as desired to different physical devices. In one embodiment using techniques herein, a thin device can be bound to a particular storage pool or set of device at a point in time so that any chunks requiring allocation of additional storage, such as may occur when writing data to the thin device, result in allocating storage from this storage pool. Such binding may change over time for a thin device.

Referring to FIG. 4A, shown is an example 700 illustrating use of a thin device in an embodiment in accordance with techniques herein. The example 700 includes a plurality of logical devices (e.g., LVs) 710a-710f and associated physical devices (or portions thereof) to which the logical devices are mapped. Element 702 represents the thin device address space or range including chunks (e.g., each having a portion of the logical block address (LBA) range 702) which are mapped to different physical storage portions. For example, element 702a denotes a chunk C1 (having a size spanning a first portion of the LBA range 702) which is mapped to a portion of LV A (logical volume A) and element 702b denotes a chunk C2 (having a size spanning a second portion of the LBA range 702) which is mapped to a portion of LV B (logical volume B). Element 702 may be a representation of a logical address range for a first thin device.

Figure 4B:
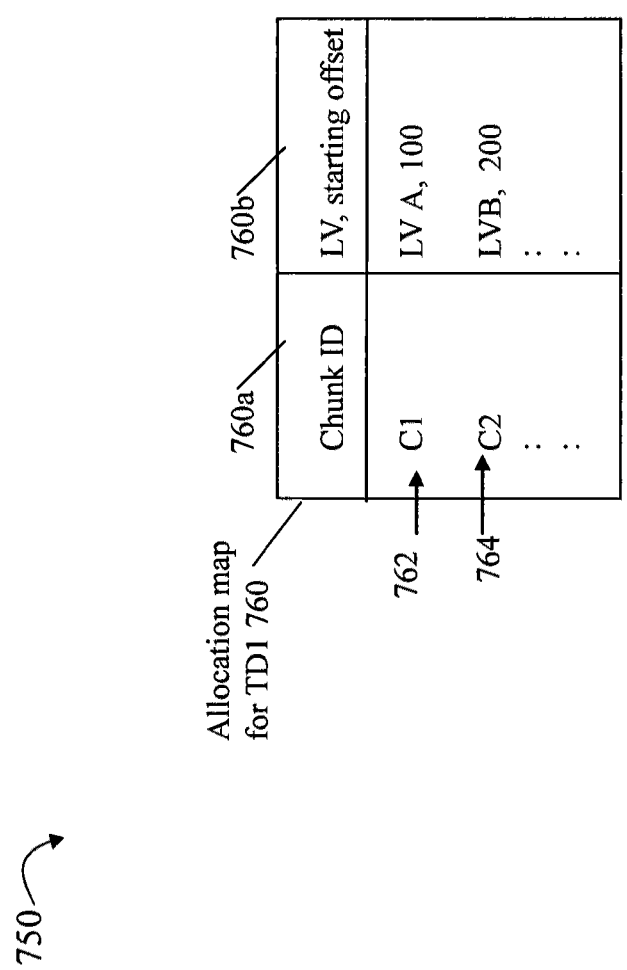
FIG. 4B is an example of representation of information that may be used in determining a physical device location mapped to a thin device.

Referring to FIG. 4B, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a system. Element 760 may represent mapping information as illustrated in FIG. 4A such as in connection the mapping of 702 to different LVs. The allocation map 760 may contain an entry for each chunk and identify which LV and associated physical storage is mapped to the chunk. For each entry or row of the map 760 corresponding to a chunk, a first column 760a, Chunk ID, denotes an identifier to uniquely identify the chunk of the TD, and a second column 760b, indicates information about the LV and offset to which the chunk is mapped. For example, entry 762 represents chunk C1 illustrated in FIG. 4A as 702a and entry 764 represents chunk C2 illustrated in FIG. 4A as 702b. It should be noted that although not illustrated, the allocation map may include or otherwise use other tables and structures which identify a further mapping for each LV such as which physical device locations map to which LVs. This further mapping for each LV is described and illustrated elsewhere herein.

Such information as illustrated and described in connection with FIG. 4B may be maintained for each thin device in an embodiment in accordance with techniques herein.

As known in the art, mirroring may be performed in order to provide duplicate copies of data. For example, an LV may be defined for which mirroring is implemented using a first physical device and a second physical device. When a write is performed to write data to the LV, the same data is written to both the first and second physical devices. Mirroring may be implemented transparently so that an issuer of the write does not know whether mirroring is being performed for the LV or thin device.

What will now be described are techniques that may be used in connection with device mirrors in order to enhance I/O performance (e.g., decrease service time and response time, and increase I/O throughput, read I/O rate, and the like). In connection with such techniques as described in more detail below, an embodiment may utilize a mirror service policy (MSP) which is static such that all reads from a data or logical device that is mirrored is serviced using data stored in a predefined portion of a physical device. The predefined portion is known to provide better performance in connection with accessing and retrieving data than if the same data is stored in any other remaining physical storage areas of the physical device. The static MSP defines criteria for how to service the read without requiring extensive runtime or dynamic evaluation of criteria such as based on current physical device I/O activity providing an indication of how busy a physical device is. In accordance with techniques herein, an embodiment may provide mirroring of a logical device using two physical devices such that each data portion written to the logical device has a first copy written to the predefined portion of a first physical device and a second copy written to a physical location of the second physical device, where the physical location of the second physical device is in an area other than the predefined portion. The embodiment may then use a static MSP as described above to always service reads for the logical device using data stored in the predefined portion such as by always retrieving the requested data from the first physical device. As will be described below, the techniques may be used for logical devices which are thin devices (e.g., elements 71-74 of FIG. 3B) as well as thick standard logical data devices (e.g., elements 61-67 of FIG. 3B).

What will now be described are different physical portions or areas of a physical rotating disk drive.

Figure 5:
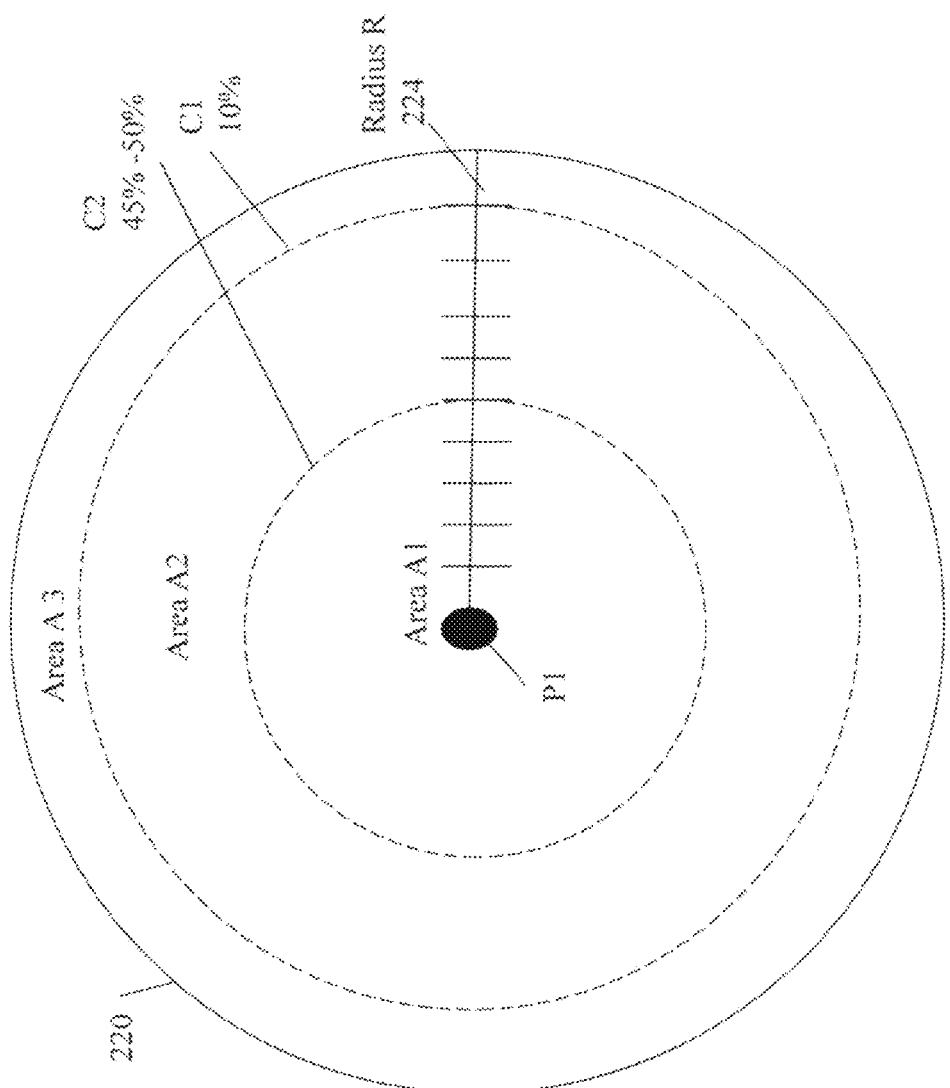
FIG. 5 is an example illustrating areas of a physical disk drive in accordance with techniques herein.
Figure 5:
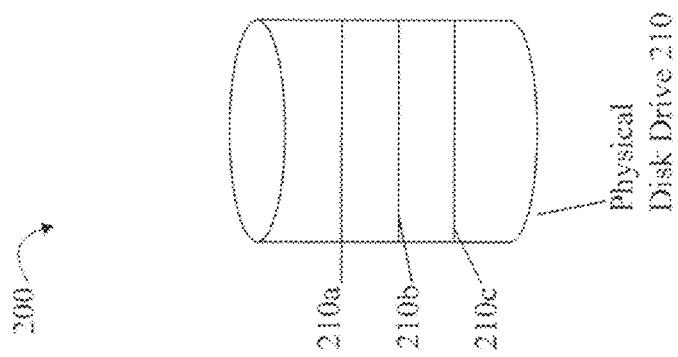

Referring to FIG. 5, shown is an example of a physical disk drive as may be used in an embodiment in accordance with techniques herein. The example 200 includes a physical disk drive 210 that is a rotating disk drive. A disk drive may comprise several platters 210a-c and data may be read from/written to on one or two surfaces/sides of a platter using a device head (e.g., 4 platters may have 8 heads, each head being associated with a particular platter and surface thereof). Tracks may form concentric circles on a single platter surface. A cylinder may be defined to include the same track number on each platter spanning all such tracks across all platters of the device. Thus, a particular platter and surface thereof may denote a vertical position and the track or cylinder may denote a horizontal position or location on a surface. Element 220 is a representation of a surface of a single platter which may include concentric tracks. The surface 220 is illustrated as including a radius R 224, circumferences or circles denoted C1 and C2, and areas A1, A2 and A3. The radius R 224 may denote the radius of the surface. Area A3 corresponds to a physical portion of the surface including tracks located between the circumference or circle C1 and the outer edge of the surface of 220. Area A1 corresponds to a physical portion of the surface include tracks located between the circumference or circle C2 and the center point P1 of the surface 220. Area A1 represents the innermost tracks or portion of the surface. Area A3 represents the outermost tracks or portion of the surface. Area A2 corresponds to a physical portion of the surface remaining (e.g., other than areas A1 and A3) as defined by the boundaries denoted by C1 and C2. Therefore, the entire physical surface capable of storing data may be partitioned into the three areas A1, A2 and A3. In this example, the radius R 224 may be divided into 10 segments as illustrated so that each segment corresponds to approximately 10% of the radius R 224 of the surface 220. From experimentation, the inventors have determined that Area A2 may be generally characterized as representing an optimal physical portion of the surface for data storage with respect to achieving performance in terms of data access time. Better performance may be observed when retrieving and accessing data stored in Area A2 relative to when accessing data stored in other remaining physical portions of the surface (e.g., as denoted by Areas A1 and A3 collectively). From experimentation, the inventors have determined that the optimal Area A2 may be defined by a first physical track or distance from the outer edge of the surface corresponding to approximately 10% of the value of radius R 224 (e.g., as represented by C1) and a second physical track or distance from the outer edge of the surface corresponding to approximately a percentage within the range of 45% to 50% of the value of radius R 224 (e.g., as represented by C2). Thus, the Area A2 may correspond to physical portions of the surface bounded by two circles denoted as C1 and C2 in FIG. 5.

The Areas A2 of all surfaces of a disk drive may be referred to herein collectively as a FAST AREA of the disk drive. All other remaining Areas A1 and A3 of all surfaces of a disk drive may be referred to herein collectively as a SLOW AREA of the disk drive. It should be noted that accessing data from the FAST AREA is generally faster (better performance achieved) relative to accessing the same data if stored in the SLOW AREA based on factors related to how the rotating disks operate, size of tracks located in Area A2 (FAST AREA), optimizations performed when servicing requests such as reordering requests with the goal of increasing overall disk performance, and the like. For example, a disk drive in an embodiment using the techniques herein may perform optimizations where the disk accesses are reordered, such as based on the required positioning of a disk head (e.g., at the proper radius/distance with respect to the center to reach a particular track, and then at the proper distance within a track/location at a position on the circumference of the track). Thus, the accesses may be placed in an ordering determined in accordance with the relative movements between successive accesses with a goal of minimizing seek time when reading data to service a particular sequence of requests. Based on experimentation performed by the inventors, results indicate that retrieving data from the foregoing FAST AREA generally provides for better performance in terms of data accesses than retrieving the data from the SLOW AREA. It should be noted that storing and hence accessing data in the FAST AREA may provide for better performance over performing the same operations when the data is stored in the SLOW AREA, where performance may be measured in a variety of different ways such as in terms of seek time (e.g., the amount of time required for the read/write heads to move between tracks over the surfaces of the platters), response time, service time, and the like.

It should be noted that Area A2, the FAST AREA, includes approximately 50% of the total storage capacity of the disk drive and collectively, the SLOW AREA (Areas A1 and A3) includes approximately 50% of the total storage capacity of the disk drive. Individually, Area A1 may contain approximately 15% of the total storage capacity of the disk drive and Area A3 may include approximately 35% of the total storage capacity of the disk drive. It should be noted that the correspondence between the physical measurements and associated disk storage capacities, the percentages associated with the radius measurements/positioning of C1 and C2 from the surface edge, and also the percentages associated with the capacities are approximations.

It should also be noted that the physical surface areas corresponding to the FAST AREA and the SLOW AREA should each be approximately the same or about 50% each so that each of the FAST AREA and SLOW AREA map to roughly half of the LBA range or logical address range for the logical device. Additionally, if the FAST AREA is defined so that C1 is 10% and C2 is in the approximate range of 45%-50% as illustrated in FIG. 5, the FAST AREA maps to LBA or logical address range for an LV starting at about 15% of the range and ending at about 65% of the LBA range (e.g., assuming that the starting point of the LBA range is mapped from the outermost tracks to the innermost tracks of the physical device).

Based on the foregoing, the physical portion of a surface which corresponds to the FAST AREA corresponds to roughly 50% of the capacity and also 50% of the LBA range. The FAST AREA correspond to roughly 50% of the physical surface area. In this way, the FAST AREA may also be characterized as a predefined physical surface area having an outermost boundary (such as the approximate 10% of distance of the radius as measured from an edge of the surface) and the FAST AREA may have an innermost boundary determined as a function of the outermost boundary so that the FAST AREA approximates 50% of the physical surface area. In a similar manner, the FAST AREA may be characterized as a predefined surface area having an inner most boundary (such as the approximate 45-%50% of distance of the radius as measured from an edge of the surface) and the FAST AREA may have an outermost boundary determined as a function of the innermost boundary so that the FAST AREA approximates 50% of the surface area. Portions of the LBA range and surface area which are not included in the FAST AREA are included in the SLOW AREA (although the LBA range associated with the SLOW AREA is not contiguous).

In an embodiment in accordance with techniques herein, data written to a logical device may be stored on one physical device in the FAST (performance) AREA and another copy of the data may be stored on a second physical device in the SLOW (performance) AREA.

With a thin provisioning embodiment where the logical device is a thin device being mirrored, the placement or location for data written may be based on the activity of the underlying physical devices so as not to overload any one particular physical device.

An embodiment in accordance with the techniques herein may define an MSP as described above which indicates which mirror/physical device to use to service a read for each LV prior to performing the read. The MSP may be defined in terms to always service the read from a physical device where the requested data is located in a FAST AREA of the physical device.

Figure 6:
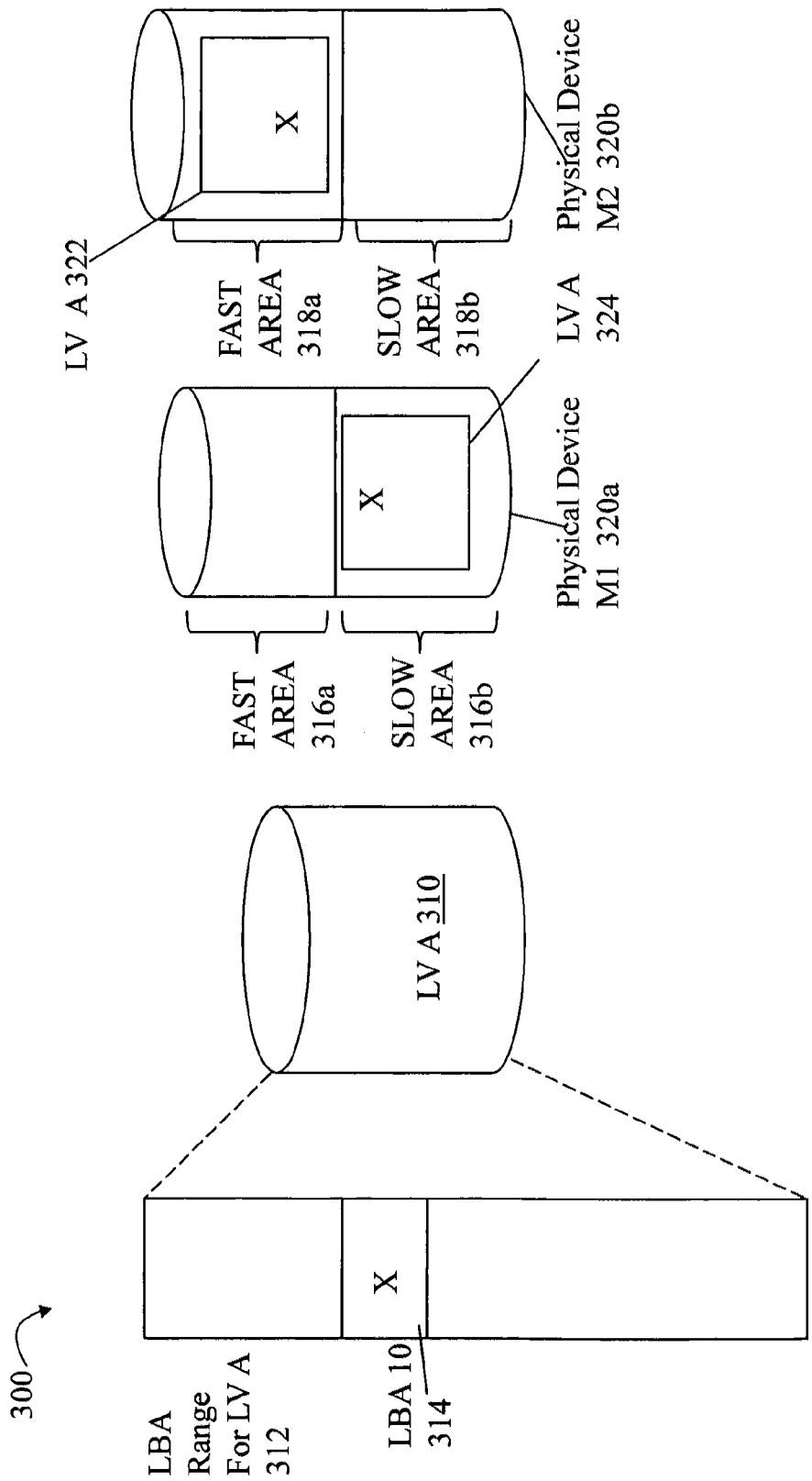
FIGS. 6-9 are examples illustrating use of the techniques herein with different logical devices.

Referring to FIG. 6, shown is an example further illustrating the techniques herein in connection with a data device or LV A. The example 300 provides a logical representation of the LBA address range 312 for LV A 310. LV A 310 may be a mirrored logical device where data for LV 310 may be stored on the two physical devices 320a and 320b. Physical device 320a has its storage capacity and corresponding physical surfaces partitioned into FAST AREA 316a and SLOW AREA 316b. In a similar manner, physical device 320b has its storage capacity and corresponding physical surfaces partitioned into FAST AREA 316a and SLOW AREA 316b. In FIG. 6 and following examples, it should be noted that SLOW AREAs, such as 316b, 318b collectively represent all of the Areas A1 and A3 for a physical device and that FAST AREAs, such as 316a, 318a represent all of the Areas A2 for a physical device as described above.

Elements 322 and 324 may represent the physical storage locations of physical storage devices 320a, 320b mapped or allocated for LV A's mirrors. Element 322 may denote the physical storage locations of physical device 320b used to store LV A's data in the FAST AREA 318a. Element 324 may denote the physical storage locations of physical device 320a used to store LV A's data in the SLOW AREA 316b.

In the example 300, a write operation 314 may be performed to write data X to LBA 10 of the LV. In accordance with the techniques herein, a first copy of data X is written to a FAST AREA of one of the physical devices (e.g., physical device 320b) and a second copy of the data A is written to a SLOW AREA of another physical device (e.g., physical device 320). The MSP indicates that all subsequent read requests for LV A's data at LBA 10 are serviced using the physical device containing the requested data in a defined FAST AREA (e.g. physical device 320b).

Figure 7:
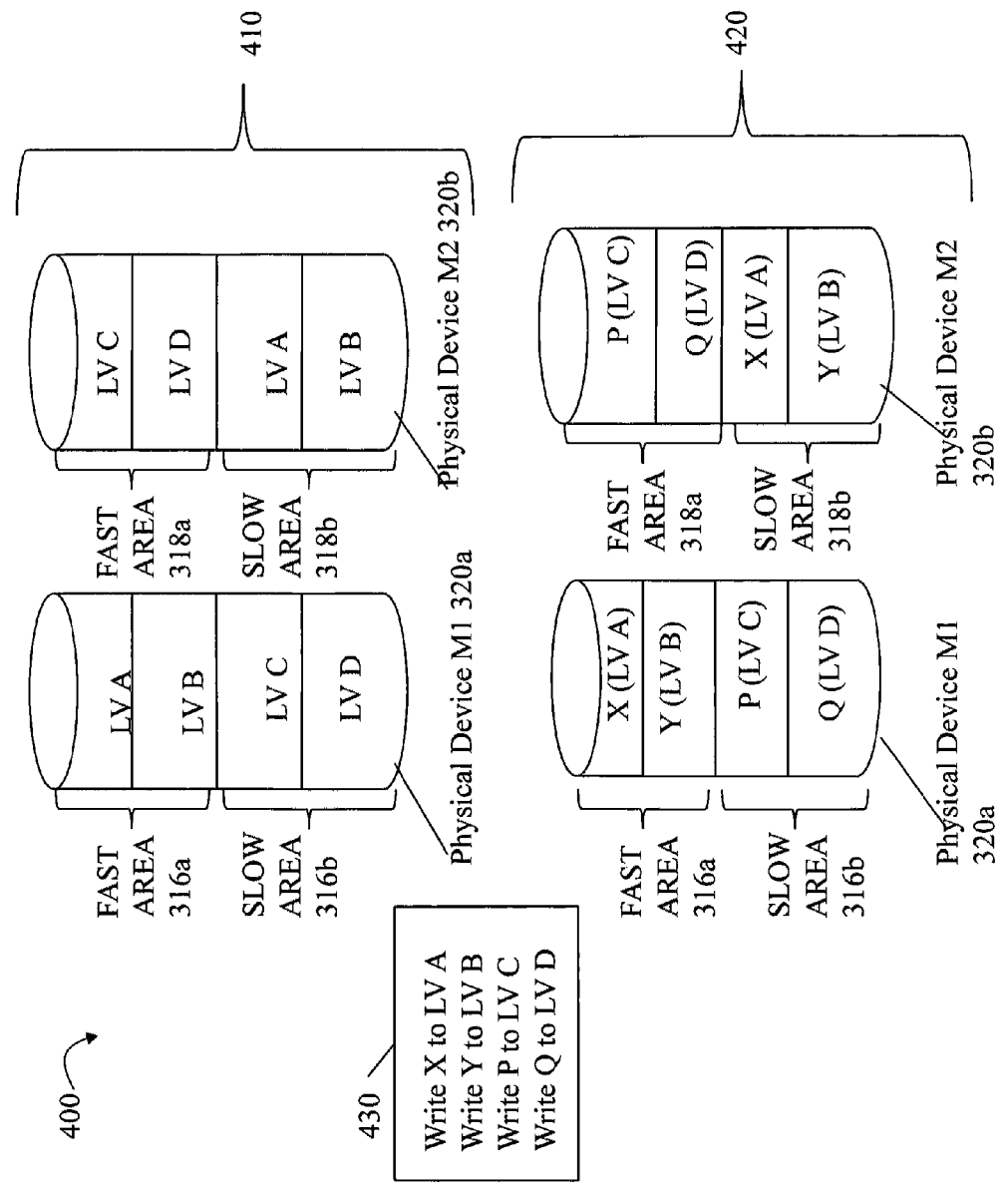

Referring to FIG. 7, shown is another example illustrating use of the techniques herein with multiple LVs and how physical storage may be allocated for the LVs in an embodiment. The example 400 includes a portion 410 illustrating how physical storage portions of physical devices 320a, 320b may be allocated for 4 mirrored LVs-LV A, LV B, LV C, and LV D. LVs A and B may have their data stored on the FAST AREA 316a of physical device 320a and on the SLOW AREA 318b of physical device 320b. LVs C and D may have their data stored on the FAST AREA 318a of physical device 320b and on the SLOW AREA 316b of physical device 320a. Accordingly, all reads for LV A and LV B are serviced using physical device 320a and all reads for LV C and LV D are serviced using physical device 320b.

Element 420 represents data stored on the physical devices 320a, 320b after applying the write operations as indicated by 430. Although no LBA is illustrated for purposes of simplicity of illustration, it should be noted that each of the write operations of 430 may indicate an LBA of the LV to which the data is written. After applying the writes of 430 in accordance with the MSP in an embodiment using the techniques herein, a subsequent read for the data item X from LV A is serviced using physical device 320a and a subsequent read for the data item P from LV C is serviced using the physical device 320b.

In FIG. 7, all of the storage of each LV is illustrated as being allocated in one entire physical contiguous portion on each physical device. As a variation to the example illustrated in FIG. 7, the LBA range of an LV or thick device may be divided into multiple partitions and each such partition may be mapped to a different area of physical storage of the physical devices.

Figure 8:
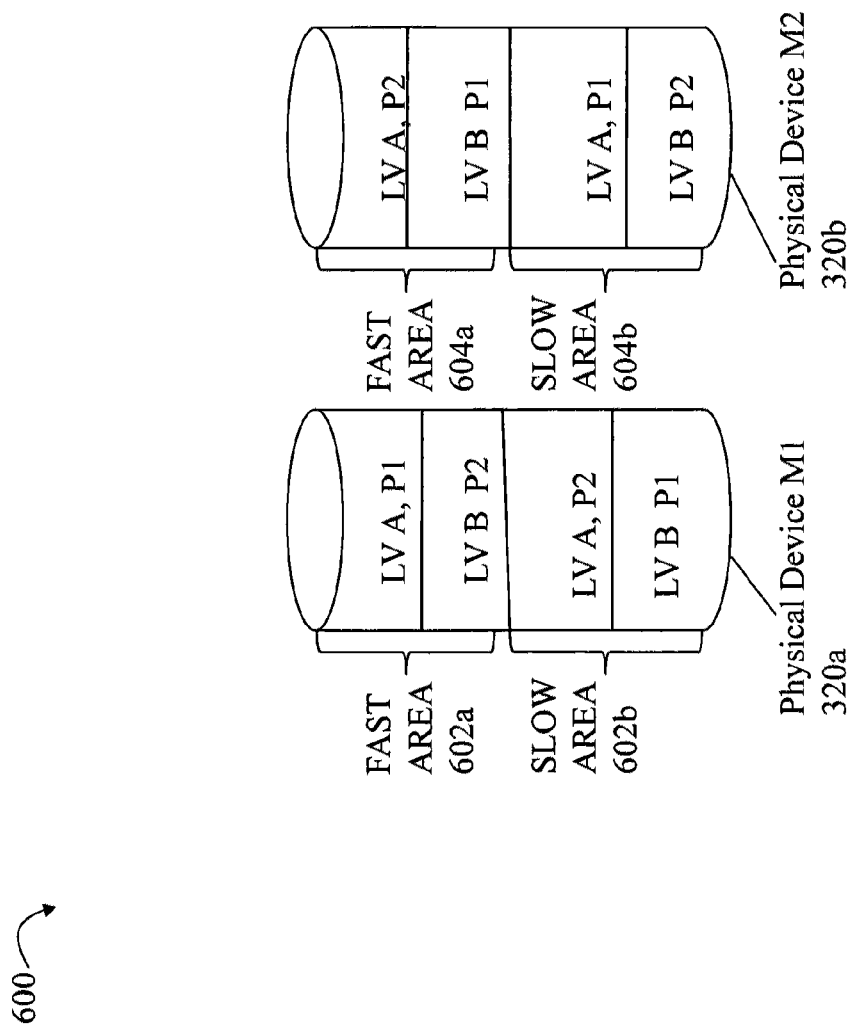

With reference to FIG. 8, shown is an example illustrating of the techniques herein where each LV is partitioned and each individual partition of the LV's LBA range may be independently mapped to physical storage. The example 600 illustrates how physical storage for two LVs-LV A and LV B—may be allocated on each of the two physical devices providing data mirroring in accordance with techniques herein. In the example 600, LV A's logical address or LBA range may be divided into 2 partitions, P1 and P2. In a similar manner, LV B's logical address or LBA range may be divided into 2 partitions, P1 and P2. The example 600 illustrates one way in which each of the individual partitions may be mapped to physical storage allocated for the LVs in accordance with techniques herein. Data for LVA, P1 and LV B, P2 may be stored in the FAST AREA 602a of physical device 320a and in the SLOW AREA 604b of physical device 320b. Data for LV B, P1 and LV A, P2 may be stored in the FAST AREA 604a of physical device 320b and in the SLOW AREA 602b of physical device 320a. An MSP may be defined which indicates to service reads within the LBA ranges corresponding to LV A, P1 and LV B, P2 using physical device 320a and to service reads within the LBA ranges corresponding to LV A, P2 and LV B, P1 using physical device 320b in order to provide for servicing all data reads using data stored in FAST AREAs.

It should be noted that although FIG. 8 illustrates an LV divided into 2 partitions, an LV may generally be partitioned into any number of partitions and similarly mapped to different physical storage locations in accordance with the techniques herein so that one copy of the partition is stored on a first physical device in a FAST AREA and another copy of the partition is stored on a second physical device in a SLOW AREA.

What will now be illustrated in more detail is an example using the techniques herein with a thin device. In one embodiment of a thin device implementation where the thin device is mirrored as described herein, the mirroring functionality may be encapsulated at the data device level or LV level where thin devices are mapped to LVs which are mirrored.

Figure 9:
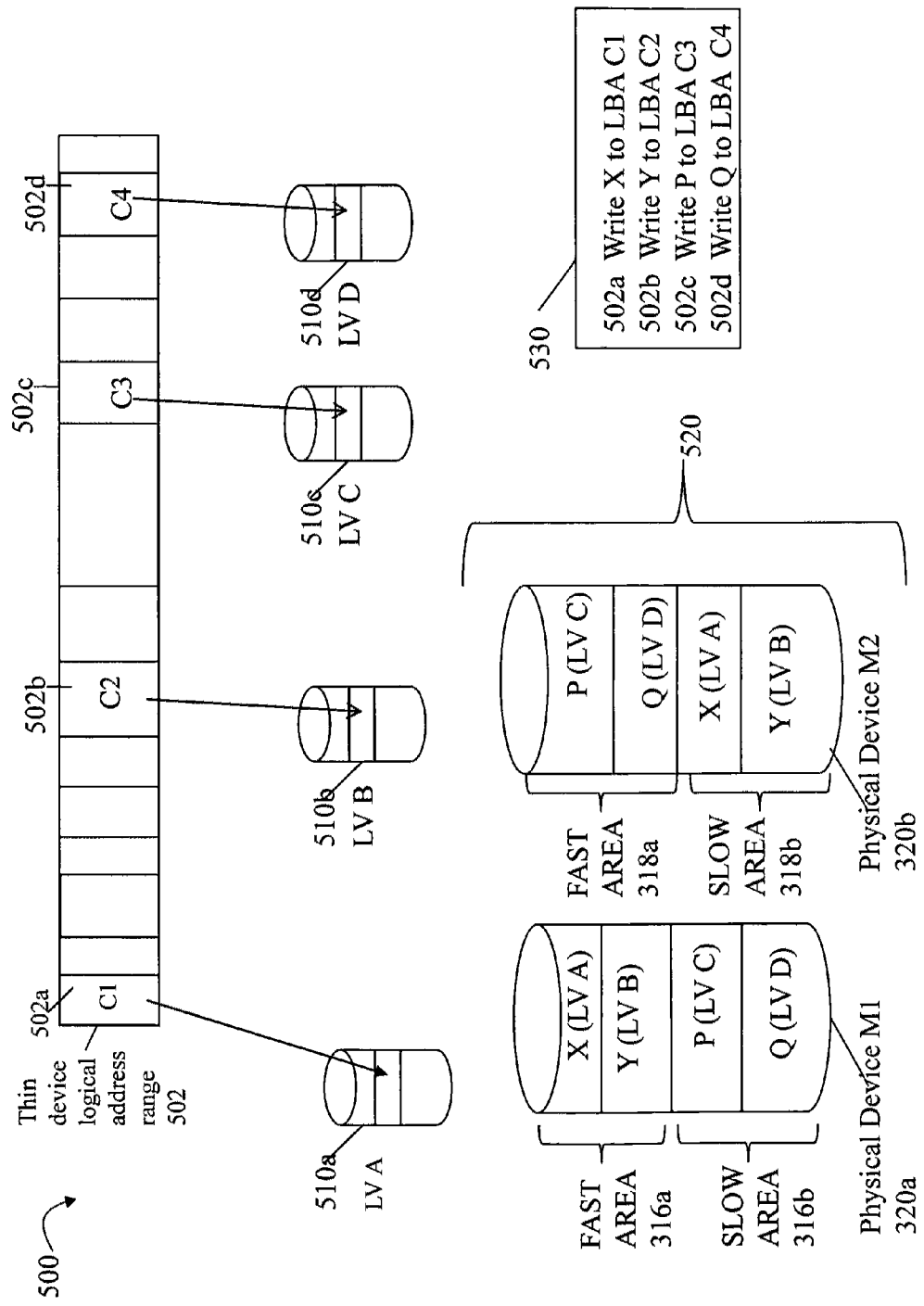

Referring to FIG. 9, shown is an example illustrating use of the techniques herein with thin devices. The example 500 includes a thin device LBA range 502 having chunks C1, C2, C3 and C4 mapped to (e.g., allocated storage on) portions of LVs A, B, C, and D, respectively. Element 520 illustrates how storage may be allocated for the underlying LVs on physical devices 320a, 320b which corresponds to the allocation as illustrated by element 410 of FIG. 7. Element 520 also illustrates data written to different portions of the physical devices 320a, 320b after applying the write operations of 530 directed to the thin device. Element 502a denotes the first write operation to write data X to the LBA C1 of the thin device. Element 502b denotes the second write operation to write data Y to the LBA C2 of the thin device. Element 502c denotes the third write operation to write data P to the LBA C3 of the thin device. Element 502d denotes the fourth write operation to write data Q to the LBA C4 of the thin device.

What will now be described are flowcharts summarizing processing as described above that may be performed in an embodiment in accordance with techniques herein.

Figure 10:
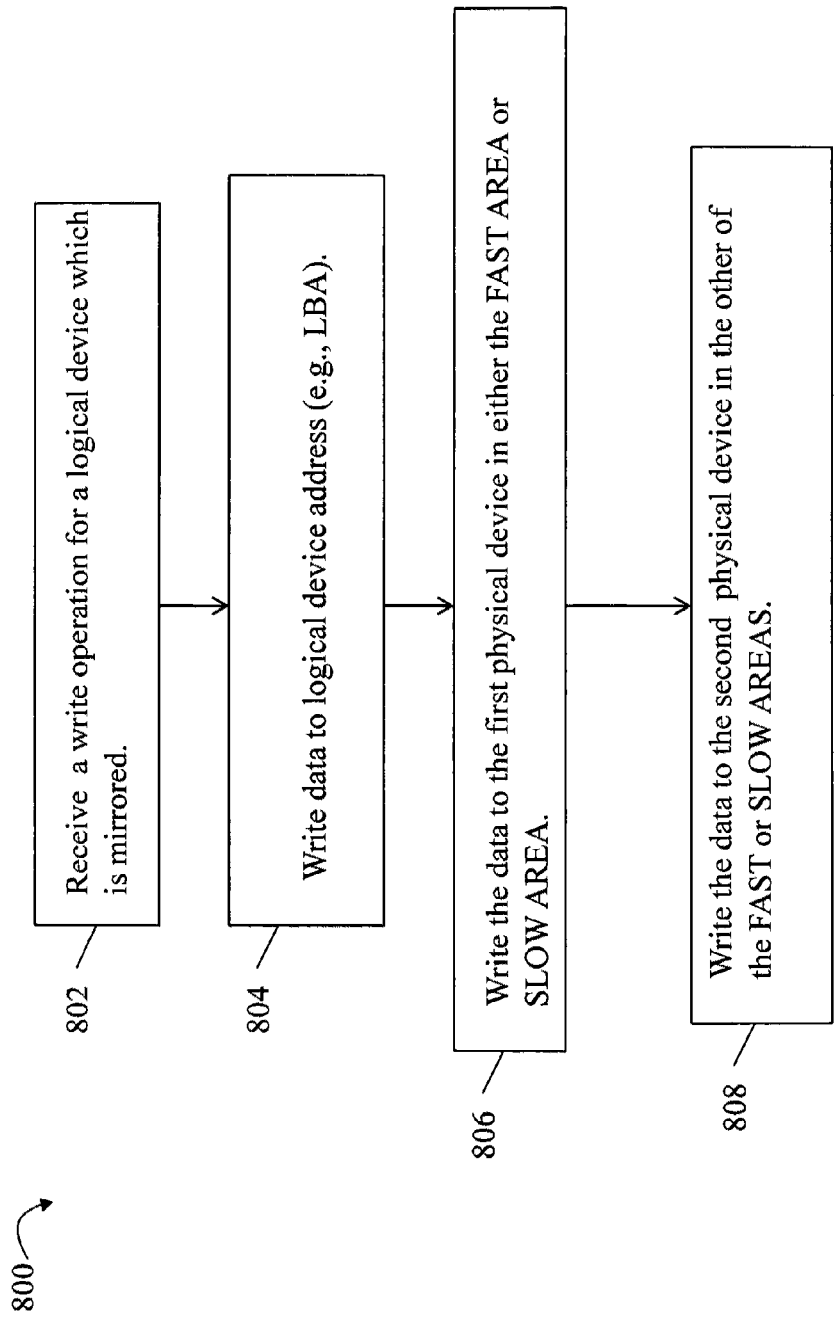
FIGS. 10 and 11 are flowcharts of processing steps that may be performed in an embodiment in accordance with techniques herein.

Referring to FIG. 10, shown is a flowchart of processing steps that may be performed when processing a write operation directed to a mirrored logical device in an embodiment accordance with techniques herein. The logical device may be, for example, a thin device or a data device such as an LV having data stored on two different physical devices. At step 802, a write operation for the logical device is received. At step 804, the write operation is processed by the receiving data storage system components. The LBA of the write operation may be translated or mapped to corresponding physical storage locations. At step 806, the write operation data is written to the first physical device in either the FAST AREA or SLOW AREA thereof. At step 808, the write operation data is written to the second physical device in the other of the FAST AREA or SLOW AREA (e.g., whichever of the FAST AREA or SLOW AREA that was not written to on the first physical device in step 806).

Figure 11:
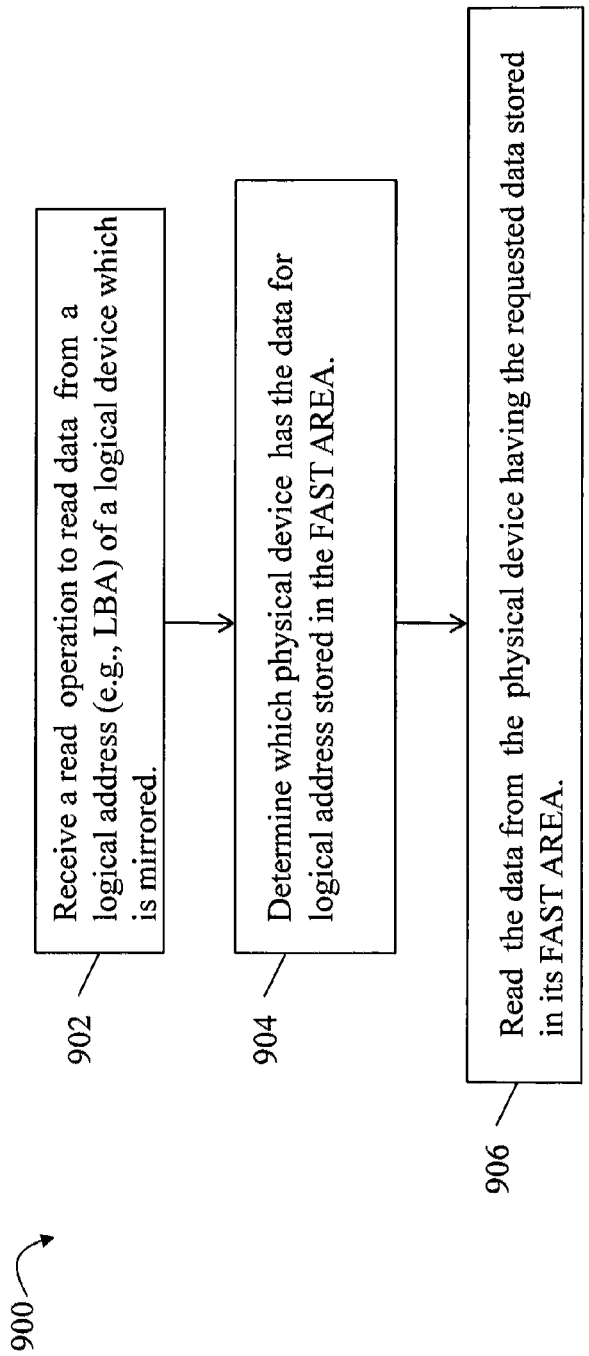

Referring to FIG. 11, shown is a flowchart of processing steps that may be performed when processing a read operation directed to a mirrored logical device in an embodiment accordance with techniques herein. At step 902, the read operation is received to read data from the mirrored logical device as described in connection with FIG. 10 processing. The LBA may be mapped to its two physical device locations where the requested data is stored. At step 904, the physical device which has the data stored in a physical location designated as a FAST AREA is used to service the read request. At step 906, the data is retrieved from the FAST AREA of the appropriate physical device.

In connection with examples herein, it should be noted that processing is performed to translate or map a logical address of a data operation (such as an LBA of a read or write operation) to a corresponding physical location on a physical device. In accordance with techniques herein with a mirrored logical device, the data does not reside at the same physical location on each of the two physical storage devices. Rather, a single LBA is mapped to two different physical storage locations on two different physical devices. Other implementations of mirroring not utilizing the techniques herein may otherwise store the same data at corresponding physical locations on two different devices so that each physical device reflects duplicative data and also has such data stored at a same location on different physical device. It will be appreciated that the examples set forth herein may be relatively simplistic for purposes of illustration but, as will be appreciated by those skilled in the art, may more readily be extended to more complex variations. For example, the techniques herein may be implemented in an embodiment which uses more than two mirror devices.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for storing data of a logical device comprising:
performing an operation to store first data to the logical device in accordance with a static policy, said logical device having data stored on a first physical device that is mirrored on a second physical device, wherein each of said first and second physical devices are defined to include a first storage area and a second storage area, said first storage area of said first physical device and said first storage area of said second physical device being corresponding physical portions each associated with a same first set of physical storage locations, said second storage area of said first physical device and said second storage area of said second physical device being corresponding physical portions each associated with a same second set of physical storage locations, said first storage areas of the first physical device and the second physical device providing better performance for accessing data than said second storage areas of the first physical device and the second physical device, said static policy indicating to service reads for logical devices using data stored in one of said first storage areas;
storing said first data at a first location in one of the first storage areas of one of the first and the second physical devices;
storing said first data at a second location in one of the second storage areas at the other of the first and the second physical devices;
receiving a read operation to read said first data; and
servicing said read operation in accordance with said static policy by accessing said first data stored in the first area of said one physical device.

2. The method of claim 1, wherein the first physical device is a first disk drive and the second physical device is a second disk drive.

3. The method of claim 2, wherein the first storage area of the first disk drive includes a first portion of the first disk drive defined at a starting track and cylinder located at a first predefined distance from an outer edge of said first disk drive to an ending track and cylinder located at a second predefined distance from the outer edge, wherein said first disk drive and said second disk drive have corresponding physical configurations and wherein the second storage area of the second disk drive is defined to include remaining tracks of the second disk drive which do not correspond to tracks included in the first storage area of the first disk drive.

4. The method of claim 3, wherein the first predefined distance is approximately 10% of a radius of the first disk drive.

5. The method of claim 4, wherein the second predefined distance is a value selected from the approximate range of 45% to 50% of the radius.

6. The method of claim 3, wherein the first storage areas of the first disk drive and the second disk drive each include approximately 50% of a total capacity of the respective disk drive and wherein the second storage areas of the first disk drive and the second disk drive each include approximately 50% of a total capacity of the respective disk drive.

7. The method of claim 3, wherein the second storage area of the second disk drive includes a first inner portion of tracks and a second outer portion of tracks separated by a third intermediate portion of tracks, wherein the third intermediate portion of the second disk drive includes only tracks of the second disk drive corresponding to tracks of the first storage area of the first disk drive.

8. The method of claim 1, wherein if said static policy further indicates to service reads for the logical device using data stored in the first storage area of the first physical device, all data portions written to the logical device are written to the first storage area of the first physical device and the second storage area of the second physical device.

9. The method of claim 8, wherein a second logical device has data stored on the first physical device that is mirrored on the second physical device, and wherein if the static policy further indicates to service reads for the second logical device using data stored in the first storage area of the second physical device, all data portions written to said second logical device are written to the first storage area of the second device and the second storage area of the first device.

10. The method of claim 1, wherein the logical device is a thin provisioned device having data portions stored on a first plurality of different physical devices and wherein the data portions are mirrored on a second plurality of different physical devices.

11. The method of claim 10, wherein the logical device has a storage capacity wherein physical storage is unallocated for at least a first portion of said storage capacity at a point in time, said first portion corresponding to a range of addresses of said logical device not mapped to physical storage.

12. The method of claim 1, wherein said first set of physical storage locations is a first predefined set of corresponding physical device tracks and cylinders for storing data, and wherein said second set of physical storage locations is a second predefined set of corresponding physical device tracks and cylinders for storing data.

13. A computer readable medium comprising code stored thereon for storing data of a logical device, the computer readable medium comprising code for:
performing an operation to store first data to the logical device in accordance with a static policy, said logical device having data stored on a first physical device that is mirrored on a second physical device, wherein each of said first and second physical devices are defined to include a first storage area and a second storage area, said first storage area of said first physical device and said first storage area of said second physical device being corresponding physical portions each associated with a same first set of physical storage locations, said second storage area of said first physical device and said second storage area of said second physical device being corresponding physical portions each associated with a same second set of physical storage locations, said first storage areas of the first physical device and the second physical device providing better performance for accessing data than said second storage areas of the first physical device and the second physical device, said static policy indicating to service reads for logical devices using data stored in one of said first storage areas;
storing said first data at a first location in one of the first storage areas of one of the first and the second physical devices;
storing said first data at a second location in one of the second storage areas at the other of the first and the second physical devices;
receiving a read operation to read said first data; and
servicing said read operation in accordance with said static policy by accessing said first data stored in the first area of said one physical device.

14. The computer readable medium of claim 13, wherein the first physical device is a first disk drive and the second physical device is a second disk drive.

15. The computer readable medium of claim 14, wherein the first storage area of the first disk drive includes a first portion of the first disk drive defined at a starting track and cylinder located at a first predefined distance from an outer edge of said first disk drive to an ending track and cylinder located at a second predefined distance from the outer edge, wherein said first disk drive and said second disk drive have corresponding physical configurations and wherein the second storage area of the second disk drive is defined to include remaining tracks of the second disk drive which do not correspond to tracks included in the first storage area of the first disk drive.

16. The computer readable medium of claim 15, wherein the first predefined distance is approximately 10% of a radius of the first disk drive.

17. The computer readable medium of claim 16, wherein the second predefined distance is a value selected from the approximate range of 45% to 50% of the radius.

18. The computer readable medium of claim 15, wherein the first storage areas of the first disk drive and the second disk drive each include approximately 50% of a total capacity of the respective disk drive and wherein the second storage areas of the first disk drive and the second disk drive each include approximately 50% of a total capacity of the respective disk drive.

19. The computer readable medium of claim 15, wherein the second storage area of the second disk drive includes a first inner portion of tracks and a second outer portion of tracks separated by a third intermediate portion of tracks, wherein the third intermediate portion of the second disk drive includes only tracks of the second disk drive corresponding to tracks of the first storage area of the first disk drive.

20. A data storage system comprising:
one or more rotating disk drives, wherein a logical device is configured having storage capacity on one or more of said rotating disk drives; and
a computer readable medium comprising code stored thereon for storing data to the logical device, the computer readable medium comprising code for:
performing an operation to store first data to the logical device in accordance with a static policy, said logical device having data stored on a first rotating disk drive that is mirrored on a second rotating disk drive, wherein each of said first and second rotating disk drives are defined to include a first storage area and a second storage area, said first storage area of said first rotating disk drive and said first storage area of said second rotating disk drive being corresponding physical portions each associated with a same first set of physical storage locations, said second storage area of said first rotating disk drive and said second storage area of said second rotating disk drive being corresponding physical portions each associated with a same second set of physical storage locations, said first storage areas of the first rotating disk drive and the second rotating disk drive providing better performance for accessing data than said second storage areas of the first rotating disk drive and the second rotating disk drive, said static policy indicating to service reads for logical devices using data stored in one of said first storage areas;
storing said first data at a first location in one of the first storage areas of one of the first and the second rotating disk drives;
storing said first data at a second location in one of the second storage areas at the other of the first and the second rotating disk drives;
receiving a read operation to read said first data; and
servicing said read operation in accordance with said static policy by accessing said first data stored in the first area of said one rotating disk drive.

* * * * *